United States Patent
Zhou et al.

(10) Patent No.: US 12,001,932 B2
(45) Date of Patent: Jun. 4, 2024

(54) HIERARCHICAL REINFORCEMENT LEARNING ALGORITHM FOR NFV SERVER POWER MANAGEMENT

(71) Applicant: Intel Corporation, Santa Clara, CA (US)

(72) Inventors: Zhu Zhou, Portland, OR (US); Xiaotian Gao, Beijing (CN); Chris MacNamara, Limerick (IE); Stephen Doyle, Ennis (IE); Atul Kwatra, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 800 days.

(21) Appl. No.: 16/939,237

(22) Filed: Jul. 27, 2020

(65) Prior Publication Data

US 2020/0356834 A1  Nov. 12, 2020

(51) Int. Cl.
  *G06N 3/006* (2023.01)
  *G06F 1/3287* (2019.01)
  *G06N 5/04* (2023.01)
  *G06N 20/00* (2019.01)

(52) U.S. Cl.
  CPC ........... *G06N 3/006* (2013.01); *G06F 1/3287* (2013.01); *G06N 5/04* (2013.01); *G06N 20/00* (2019.01)

(58) Field of Classification Search
  CPC .......... G06N 3/006; G06N 5/04; G06N 20/00; G06N 3/088; G06F 1/3287; G06F 1/3206; G06F 1/324; Y02D 10/00
  See application file for complete search history.

(56) References Cited

U.S. PATENT DOCUMENTS

| | | | | |
|---|---|---|---|---|
| 2013/0139170 | A1* | 5/2013 | Prabhakar | G06F 9/4893 718/104 |
| 2014/0052678 | A1* | 2/2014 | Martinez | G06N 3/045 706/21 |
| 2018/0026910 | A1* | 1/2018 | Balle | H03M 7/4056 709/226 |
| 2018/0349158 | A1* | 12/2018 | Swersky | G06N 20/00 |

OTHER PUBLICATIONS

Online learning in Artificial Neural Networks for CMP uncore power management Published in: 2014 IEEE 20th International Symposium on High Performance Computer Architecture (HPCA) (pp. 308-319 (Year: 2014).*

* cited by examiner

*Primary Examiner* — Pei Yong Weng
(74) *Attorney, Agent, or Firm* — Compass IP Law PC

(57) ABSTRACT

Methods and apparatus for hierarchical reinforcement learning (RL) algorithm for network function virtualization (NFV) server power management. A first RL model at a first layer is trained by adjusting a frequency of the core of processor while performing a workload to obtain a first trained RL model. The trained RL model is operated in an inference mode while training a second RL model at a second level in the RL hierarchy by adjusting a frequency of the core and a frequency of processor circuitry external to the core to obtain a second trained RL model. Training may be performed online or offline. The first and second RL models are operated in inference modes during online operations to adjust the frequency of the core and the frequency of the circuitry external to the core while executing software on the plurality of cores of to perform a workload, such as an NFV workload.

23 Claims, 11 Drawing Sheets

$S$: system state (rx_rate, platform telemetry, etc.) - context
$a$: action (frequency scaling, cache allocation, etc.)
$f(a, s)$: consequence of taking action $a$ at state $s$.
Reward reflects the objective (lower freq and no packet loss)

Algorithm 1 Contextual Bayesian Optimization (CBO) for NVF closed-loop automation

Input: GP prior $\mu_0(x)$ and $k_0(x, x')$; Trade-off factor $\beta_t$ for $t = 1, 2, \ldots$ do:

1. Collect network operating state $s_t$
2. Choose $a_t = \arg\max_a \mu_{t-1}(a, s_t) + \sqrt{\beta_t k_{t-1}((a, s_t), (a, s_t))}$
3. Apply $a_t$ on system and get reward $f_t = f(a_t, s_t)$
4. Add tuple $(a_t, s_t, f_t)$ to dataset $\mathcal{D}$
5. Update GP posterior $\mu_t(x)$ and $k_t(x, x')$ based on $\mathcal{D}$ end for

*Fig. 3*

$$r_{pkt\_loss} = \begin{cases} -2 & if\ pkt_{loss} > 0 \\ 1 & if\ pkt_{loss} == 0 \end{cases}$$

$$r_{freq} = (2.0 - f_t) * 0.1 \qquad f_t: 1.0\text{–}2.3\ GHz$$

$$r_t = r_{pkt\_loss} + r_{freq}$$

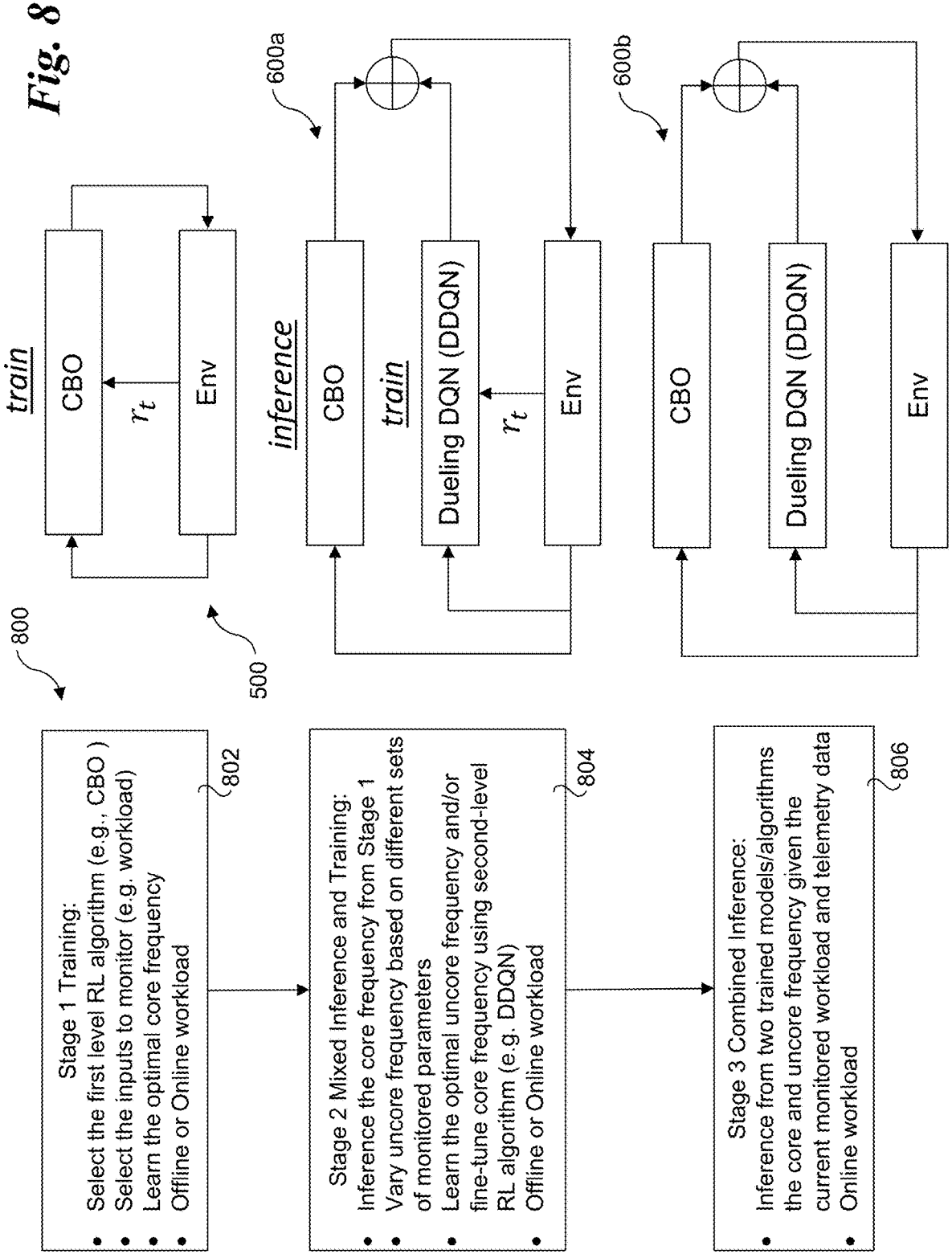

HIERARCHICAL REINFORCEMENT LEARNING ALGORITHM FOR NFV SERVER POWER MANAGEMENT

BACKGROUND INFORMATION

In recent years there has been tremendous growth in the usage of so-called "cloud-hosted" services. Examples of such services include e-mail services provided by Microsoft (Hotmail/Outlook online), Google (Gmail) and Yahoo (Yahoo mail), productivity applications such as Microsoft Office 365 and Google Docs, and Web service platforms such as Amazon Web Services (AWS) and Elastic Compute Cloud (EC2) and Microsoft Azure. Cloud-hosted services and cloud-based architectures are also widely used for telecommunication networks and mobile services.

Cloud-hosted services including Web services, Software as a Service (SaaS), Platform as a Service (PaaS), and Infrastructure as a Service (IaaS). Cloud Service Providers (CSP) have implemented growing levels of virtualization in these services. For example, deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications (including virtual network functions (VNFs), network service providers can gain flexibility in network configuration, enabling significant benefits including optimization of available bandwidth, cost savings, and faster time to market for new services.

In addition to cloud-hosted services, high performance computing (HPC) has also seen substantial growth. Cloud-hosted services and HPC environments are typically implemented using data centers that have a very large number of compute resources, implemented in racks of various types of servers, such as blade servers filled with server blades and/or modules and other types of server configurations (e.g., 1U, 2U, and 4U servers). Due to high power densities in these installations, performance is generally limited by thermal loading limits rather than processor performance.

For example, processors in high-performance servers generally are operated in view of thermal design power (TDP) specifications. In some installations, there is a nominal TDP power limit (e.g., 185 (W)atts), and a turbo mode limitation (e.g., 225W). Generally, turbo mode can be used for shorter durations and is restricted to a portion of processors in a given thermal envelope. For instance, for a blade server installation in which 8-12 blade servers are installed in a chassis or drawer, only a portion of the processors may operate in turbo mode at any point in time. Depending on the processor power densities, airflow, cooling, and other considerations, some processors may need to be operated below TDP limits.

Power consumption for a processor is managed by adjusting the processor frequency. For earlier generations of processors, this was done by adjusting the processor frequency as a whole. Recently introduced processors are configured to enable the frequency of the processor cores and the frequency of the (generally) rest of the processor (i.e., circuitry external to the core referred to as the "uncore" herein) to be adjusted separately. The ability to use separate core and uncore frequencies is advantageous for NFV servers and the like, since they have higher uncore workloads than servers that are primarily used for their compute resources.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is a diagram illustrating an algorithm for implementing CBO for NFV closed loop automation;

FIG. 8 is a combination stage flow and RL algorithm training and inference diagram illustrating a training, mixed inference and training, and combined inference stages by training and implementing a hierarchical RL algorithm;

DETAILED DESCRIPTION

Figure 1:
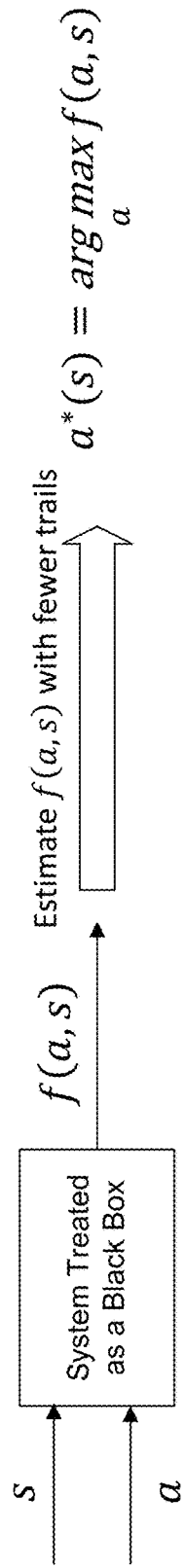
FIG. 1 is a diagram illustrating a conceptual view of a Contextual Bayesian Optimization algorithm.

Embodiments of methods and apparatus for hierarchical reinforcement learning algorithm for NFV server power management are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, the frequencies of processor cores and the processor uncore circuitry are dynamically optimized using a hierarchical Machine Learning (ML) scheme to reduce power while maintaining one or more performance metrics, such as defined in a service level agreement (SLA metrics). In one aspect, an ML model comprising a contextual Bayesian optimization (CBO) Reinforcement Learning (RL) model is used to quickly find a baseline core frequency based on packet receive (RX) rate. A second ML model is then used to refine core frequency and adjust uncore frequency by monitoring relevant telemetry data, such as Last Level Cache (LLC), memory bandwidth, branch ratio, and packet ratios.

Probabilistic based algorithms like contextual Bayesian optimization are very sample efficient but incurs heavy computing penalty as the feature space and number of samples increase. Deep Neural Network based RL such as Double Deep Q Network (DDQN) on the other hand is less sample efficient but scalable to large number of inputs/outputs and samples. Under the hierarchical RL approach disclosed herein, the idea is to combine different RL algorithms leveraging their own strength avoiding the weakness to solve the problem of core and uncore frequency scaling efficiently and quickly.

In some embodiments, the optimization problem is to scale core and uncore frequency for power saving while ensuring no packet loss. Under one approach, only the downstream packet processing is considered as upstream traffic is limited and varying very little. In some embodiments, downstream packet processing for one service group is done in one dedicated core, and the objective is to find the lowest frequency at any traffic rate that guarantees no packet loss. For uncore frequency, since multiple service groups running on different cores share the same uncore, the uncore frequency needs to be set to the highest frequency among all the service groups to avoid impact to any service group.

Overview of Contextual Bayesian Optimization (CBO)

The first optimization problem is to optimize the core frequency. Generally, ML algorithms such as RL algorithms require a large number of samples for training, with more training samples (generally) leading to better performing models. However, collection and processing of training samples incurs a processor overhead cost in terms of compute cycles. This sampling cost is particularly high for deep neural network based RL algorithms. By comparison, contextual Bayesian optimization (CBO) is at least an order of magnitude more efficient than deep neural network based RL algorithms. Accordingly, a CBO RL model is used to perform initial optimization of core frequency in some embodiments.

The objective of NFV closed-loop automation is to adjust hardware resources based on workload variation. Mapping to a typical reinforcement learning concept, the incoming traffic and current network operation status indicated by the platform and VNF telemetry data form the state $S_t$. The action includes hardware configuration adjustments such as core frequency scaling, cache/memory bandwidth allocation, etc. The reward reflects the goals which in NFV context can be higher packet processing throughput, lower latency, increased hardware utilization, energy saving while satisfying the required service level agreement (e.g. no packet loss).

One way to tackle this problem is to treat it as a contextual bandit problem, which is a multi-objective variant of the bandit problem. The Bandit problem could be identified as a one-state Markov Decision Process (MDP), so system dynamics are no longer needed to take into account. In contrast, contextual parameters are introduced to model system operating states.

Formally, considering an N-dimensional action space $a \in \mathbb{R}^N$, and an M-dimensional state space $s \in \mathbb{R}^M$, the contextual bandit problem may be formulated as, $$a^*(s) = \arg\max_a f(a, s) \tag{1}$$

where $f(a, s)$ is the reward function which evaluates how good the action a we take is at network operating state s, $a^*(s)$ is the control policy we want to learn from trial-and-errors, which returns the optimal action $a^*$ given a specific network operating state s.

The foregoing is illustrated in FIG. 1. As shown, reward function $f(a, s)$ is treated a black-box function, which means that the formulation of $f(a, s)$ is unknown. The only information available from $f(a, s)$ is to query its return with specific a and s. Since it is a black-box function, some important information needed to optimize Eq. (1), like its derivative, is inaccessible. Consequently, the goal is to optimize Eq. (1) with as few of queries as possible.

In the example of FIG. 1, s is a system state such as packet receive rate (rx_rate), platform telemetry data, etc. Action a may include one or more of frequency scaling, cache allocation, etc. The reward function $f(a, s)$ reflects some objective, such as operating the processor cores at lower frequency without packet loss.

One of the methods to optimize Eq. (1) is the contextual Bayesian optimization, which is a multi-objective variant of regular Bayesian optimization. It leverages Bayesian framework to infer which action is the most possible one to achieve the maxima of reward function given a specific contextual parameter.

As regular Bayesian optimization, CBO consists of two components: a surrogate model, which is a posterior distribution of the objective function inferred from prior distribution and data we observed, and an acquisition function defined from this surrogate to decide where to sample next. First, infer the posterior distribution of the reward function from prior distribution and trial-and-error samples using the Bayesian theorem, $$p(f|\mathcal{D}) \propto p(\mathcal{D}|f)p(f) \tag{2}$$

Figure 2:
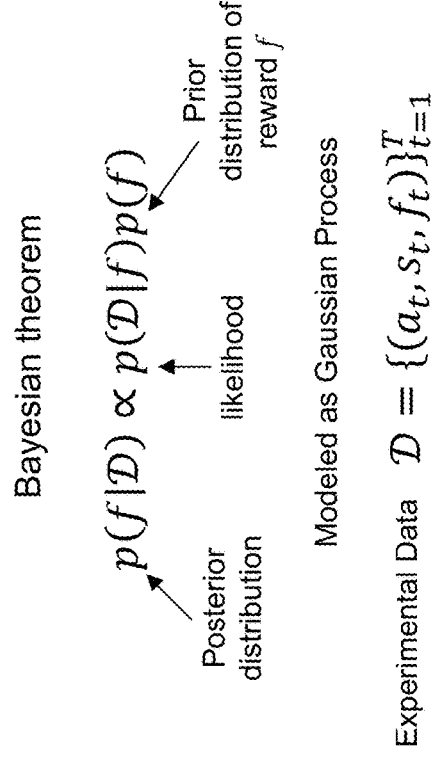
FIG. 2 is a diagram illustrating the Bayesian theorem.

As shown in FIG. 2, $\mathcal{D} = \{(a_t, s_t, f_t)\}_{t=1}^T$ is the set of all samples we have at a certain time step T; $p(f)$ is the prior distribution of reward function over $\mathcal{F} \triangleq \{f\}$, the set of all reward functions over system action-state space; $p(\mathcal{D}|f)$ is the likelihood, and $p(f|\mathcal{D})$ is the posterior distribution over $\mathcal{F}$. Generally, a Gaussian process prior and a Gaussian likelihood is assumed, so that the posterior distribution has closed-form solution, which is a Gaussian process as well.

A Gaussian process (GP) is a set of infinite random variables $\{f(x)|x \in \chi\}$ for which any finite subset follows a Gaussian distribution. In terms of NFV closed-loop automation, x is an N+M dimensional vector combined with action a and state s. A mean function $u(x)$ and a kernel function $k(x, x')$ are sufficient to specify a GP. The kernel function (also called covariance function) typically depends on a set of hyper parameters $\theta$, which can be learnt by maximizing the marginal likelihood, $$\ln p(\mathcal{D}|\theta) = -\tfrac{1}{2}\ln|C_T| - \tfrac{1}{2} f^T C_T^{-1} f - \tfrac{1}{2} \ln 2\pi \quad (3)$$

Here, $f$ is a T-dimensional column vector with elements $f_i$; $C_T$ is a T×T matrix with elements $C_{ij} = k(x_i, x_j) + \beta^{-1} \delta_{ij}$, where i, j=1, 2, ..., T and is a hyperparameter representing the precision of Gaussian likelihood, $\delta_{ij}$ is the Kroenker delta. The posterior GP induced by samples can be specified by a posterior mean function and a posterior covariance function:

$$\mu'(x) = k_x^T C_T^{-1}(f - \mu) + \mu(x) \quad (4)$$

$$k'(x,x') = k(x,x') - k_x^T C_T^{-1} k_{x'} \quad (5)$$

Here, $k_x$ is a column vector with elements $k_i = k(x, x_i)$, $k_{x'}$ is a column vector with elements $k_i = k(x', x_i)$, and $\mu$ is a column vector with element $\mu_i = \mu(x_i)$.

Subsequently, one could decide which action should be taken next by using known GP posterior. The strategy taken to decide the next action is called the acquisition function, which maps GP posterior to the next action. A straightforward strategy is to choose the action which is the most probable to achieve the maximum reward given the contextual parameter(s). However, it usually leads to a sub-optimal convergence since exploration of an insufficiently sampled region is not encouraged. On the other hand, if one always tends to explore, the optimization of Eq. (1) will converge too slow, and thus lose data efficiency. Thus, balance between exploration and exploitation is a key problem of contextual Bayesian optimization.

A popular acquisition function called Gaussian process upper confidence bound (GP-UCB) guarantees the global optimum while trading off the exploration and exploitation in a principled way. Suppose the maximum point of unknown function $f$ is $x^* = \arg\max_x f(x)$. For our choice $x_t$ in round t, we incur instantaneous regret $\tau_t = f(x^*) - f(x_t)$. GP-UCB guarantees the accumulative regret $R_T = \Sigma_{t=1}^T \tau_t$ has a desirable asymptotic property:

$$\lim_{T \to \infty} \frac{R_T}{T} = 0 \quad (6)$$

if one chooses the next sample by solving the optimization problem:

$$x_t = \arg\max_x \mu_{t-1}(x) + \sqrt{\beta_t k_{t-1}(x, x)} \quad (7)$$

Here, $\beta_t$ is the trade-off factor at round t. Eq. (6) implies that GP-UCB is a no-regret method, which makes sure that CBO converges to a global optima using a handful of trials.

Finally, the contextual Bayesian optimization algorithm adopted to realize NFV closed-loop automation is summarized as Algorithm 1 shown in FIG. 3.

Figure 4:
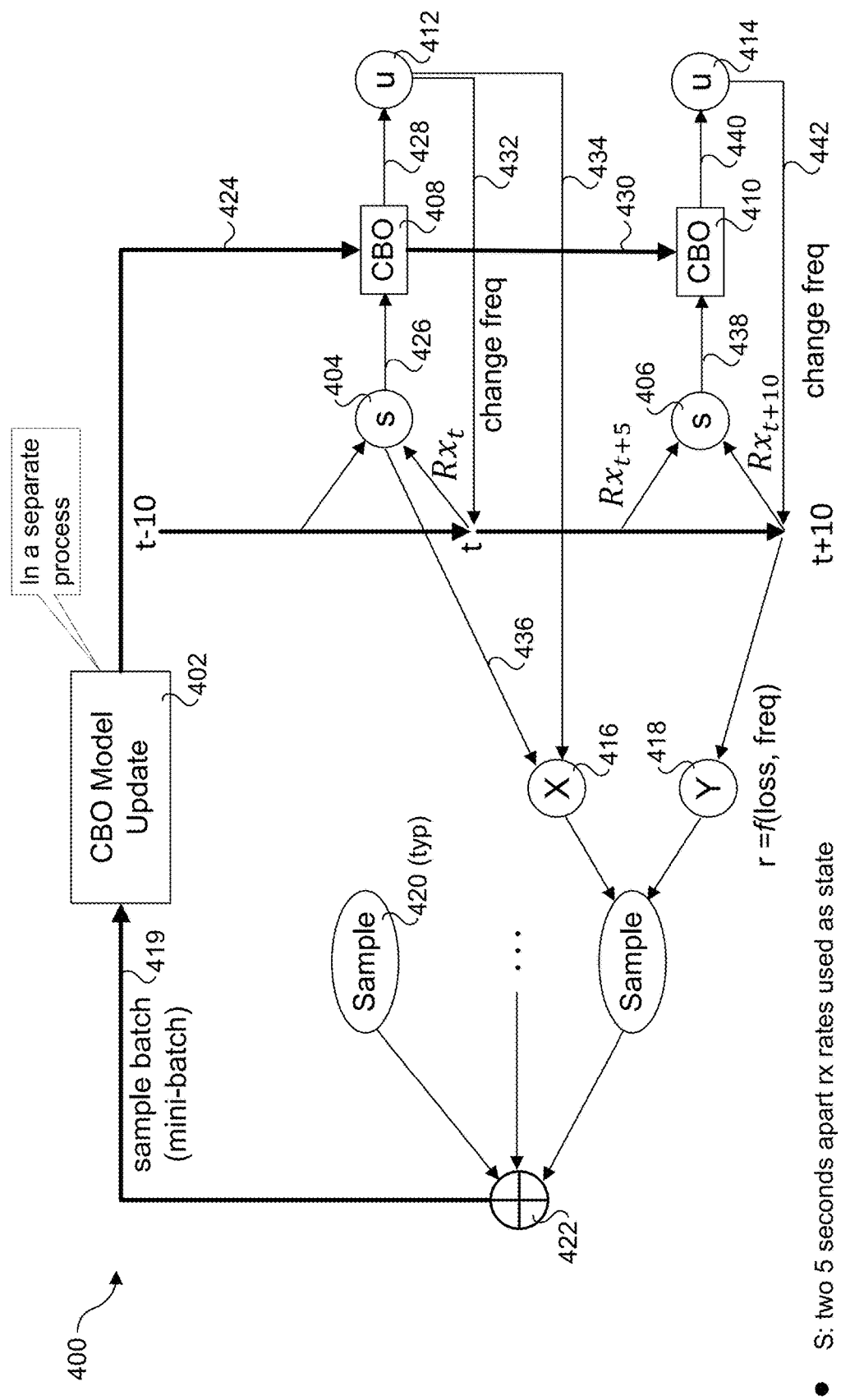
FIG. 4 is a schematic representation of algorithm for implementing CBO for NVF closed loop automation, according to one embodiment.

FIG. 4 shows an algorithm 400 (Algorithm 1) for implementing contextual Bayesian optimization for NVF closed loop automation, according to one embodiment. The initial inputs include GP prior mean function $\mu_0(x)$ and kernel function $k_0(x, x')$. The trade-off factor is $\beta_t$ (at round t). The algorithm loops over samples 1, 2, . . . n, where n is the mini-batch size.

In a first operation 1, the network operating state $s_t$ is collected. During a second operation 2, $a_t$ (action at time t) is chosen as, $$a_t = \arg\max_a \left( \mu_{t-1}(a, s_t) + \sqrt{\beta_t k_{t-1}((a, s_t), (a, s_t))} \right)$$

where $\mu_{t-1}(a, s_t)$ is the mean function and $\sqrt{\beta_t k_{t-1}((a,s_t),(a,s_t))}$ is upper confidence bound.

During a third operation 3, $a_t$ on the system is applied to get reward $f_t = f(a_t, s_t)$. During a fourth operation 4, the tuple $(a_t, s_0, f_t)$ is added to dataset $\mathcal{D}$. The GP posterior $\mu_t(x)$ and $k_t(x, x')$ are then updated based on $\mathcal{D}$ during a fifth operation 5.

It is noted that operations 2 and 5 respectively employ maximizing marginally likelihood Eq. (3) and acquisition function Eq. (7). Both the marginal likelihood and acquisition function are usually non-convex, so a global optimization technique is employed in one embodiment.

One embodiment of the CBO training flow 400 is shown in FIG. 4. The blocks and components includes a CBO model update (training) 402, sample states 404 and 406, CBO inference blocks 408 and 410, action blocks 412 and 414, a training sample input 416, a reward signal 418, previous samples 420, and an aggregating block 422. Training and generating of reward signal 418 are performed in parallel, using a sample batch 419 comprising a mini-batch. The CBO model is updated online with each mini-batch. In the illustrated example, samples are taken every 10 seconds and the mini-batch is 16 samples that are accumulated over 160 seconds.

CBO inference block 408 uses updated model from previous round (424) and state input 426 from state aggregator 404. In one embodiment state aggregator 404 consists of the packet Rx rates at sample times t−5 and t ($Rx_{t-5}$ and $Rx_t$). CBO inference block 408 provides an output 428 to action block 412. Action block 412 processes input 428 and outputs a change frequency signal 432 that is used to adjust the core frequency at time t. Action block 412 also outputs the action signal 434 that is employed as a portion of training sample input 416. The other part of training sample input 416 is sample state 404, as depicted by input 436.

Operations and associated inputs and outputs for CBO inference block 410 are shown in the lower right portion of FIG. 4. The operations are similar to those described above for CBO inference block 408, except the timeframe for the inputs has advanced by 10 seconds. Thus, packet Rx rates at sample times t+5 and t+10 ($Rx_{t+5}$ and $Rx_{t+10}$) are received as inputs for sample state 406 and are combined into an input 438 that received by CBO inference block 410. CBO inference block processes inputs 430 and 438 to generate an output 440 that is input to action block 414. Action block 414 outputs a change frequency signal 442 that is used to adjust the core frequency at time t+10. The reason to draw a duplicate inference cluster is to show that reward signal is calculated 10 seconds later to account for the previous action.

Reward signal 418 combines the (updated) frequency at time t+10 and caused packet loss (if any). Each sample 420 includes training sample signal 416 and reward signal 418. Summing block 422 is used to depict multiple samples 420 corresponding to sample batch 419.

Figure 5A:
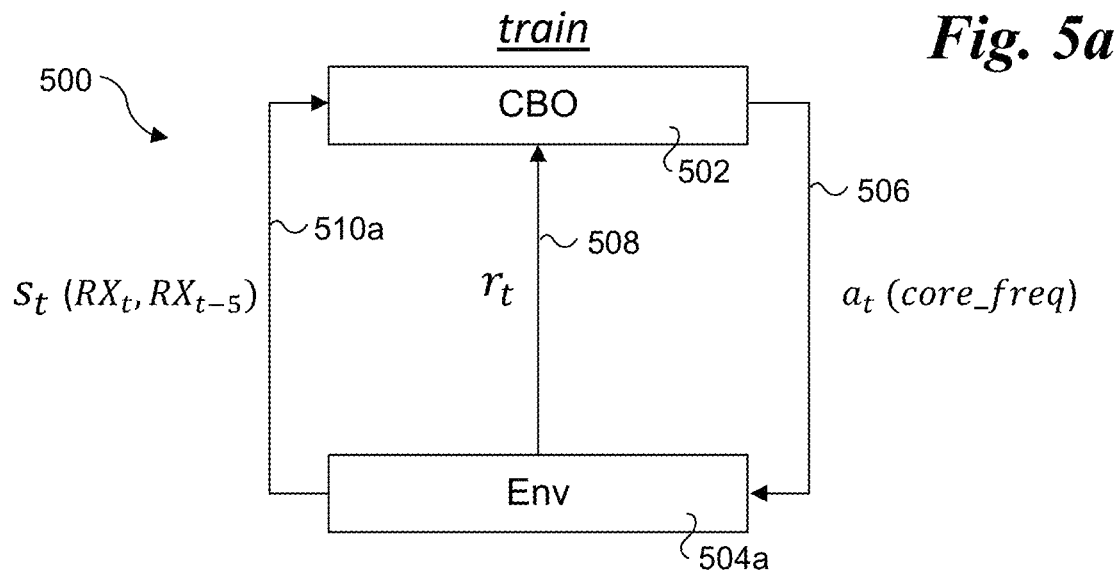
FIG. 5a is a diagram illustrating a high-level view of a CBO training model, according to one embodiment.
Figure 5B:
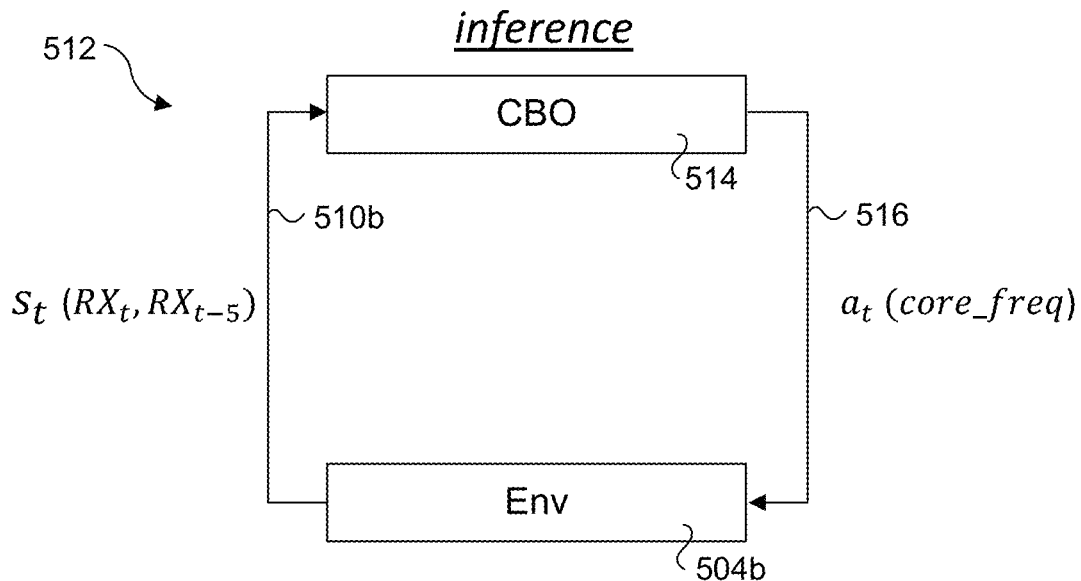
FIG. 5b is a diagram illustrating a high-level view of a high-level CBO inference model, according to one embodiment.

FIGS. 5a and 5b respectively show a high-level CBO training model 500 and a high-level CBO inference model 512. CBO training model 500 includes a CBO training block 502 and a system environment (Env) 504. CBO training block 502 outputs an action 506 comprising a core frequency that is to be used for processor cores in the Env 504. Env 504 outputs a reward ($r_t$) 508 that consists of two parts r ($r_{pkt\_loss}$ and $r_{freq}$ to penalize the packet loss while encourage lower frequency for power saving:

$$r_{pkt\_loss} = \begin{cases} -2 & \text{if } pkt_{loss} > 0 \\ 1 & \text{if } pkt_{loss} == 0 \end{cases}$$

$$r_{freq} = (2.0 - f_t) * 0.1$$

$$f_t: 1.0 - 2.3 \text{ GHz}$$

$$r_t = r_{pkt\_loss} + r_{freq}$$

Rx state information 510a comprising packet receive rates at times t and t−5 ($s_t$ ($RX_t$, $RX_{t−5}$)) are also collected from Env 504 using associated telemetry data. Reward 508 and Rx state information 510a are provided as feedback inputs to CBO training block 502. This training cycle is repeated on an ongoing basis (i.e., online training). During CBO training, the uncore frequency is fixed. That concludes the first layer model training. The CBO model learns the baseline core frequency at any RX input state.

The CBO inference model 512 in FIG. 5b uses a CBO inference block 514 that is obtained by training CBO training block 502 during previous training (e.g., as described above for CBO training model 500). Generally, in terms of inputs and outputs the CBO training and CBO inference models are similar, except a CBO inference model does not include a reward input. In addition to CBO inference block 514, CBO inference model 512 includes an Env 504b, where Env 504a and 504b represent the same system environment under different states. In a manner similar to CBO training model 500, CBO inference block 514 outputs an action 516 comprising a core frequency that is to be used for processor cores in the Env 504b. Rx state information 510b comprising packet receive rates at times t and t−5 ($s_t$ ($RX_t$, $RX_{t−5}$)) are also collected from Env 504b using associated telemetry data. It is noted that times t and t−5 in FIGS. 5a and 5b correspond to different times.

Figure 6A:
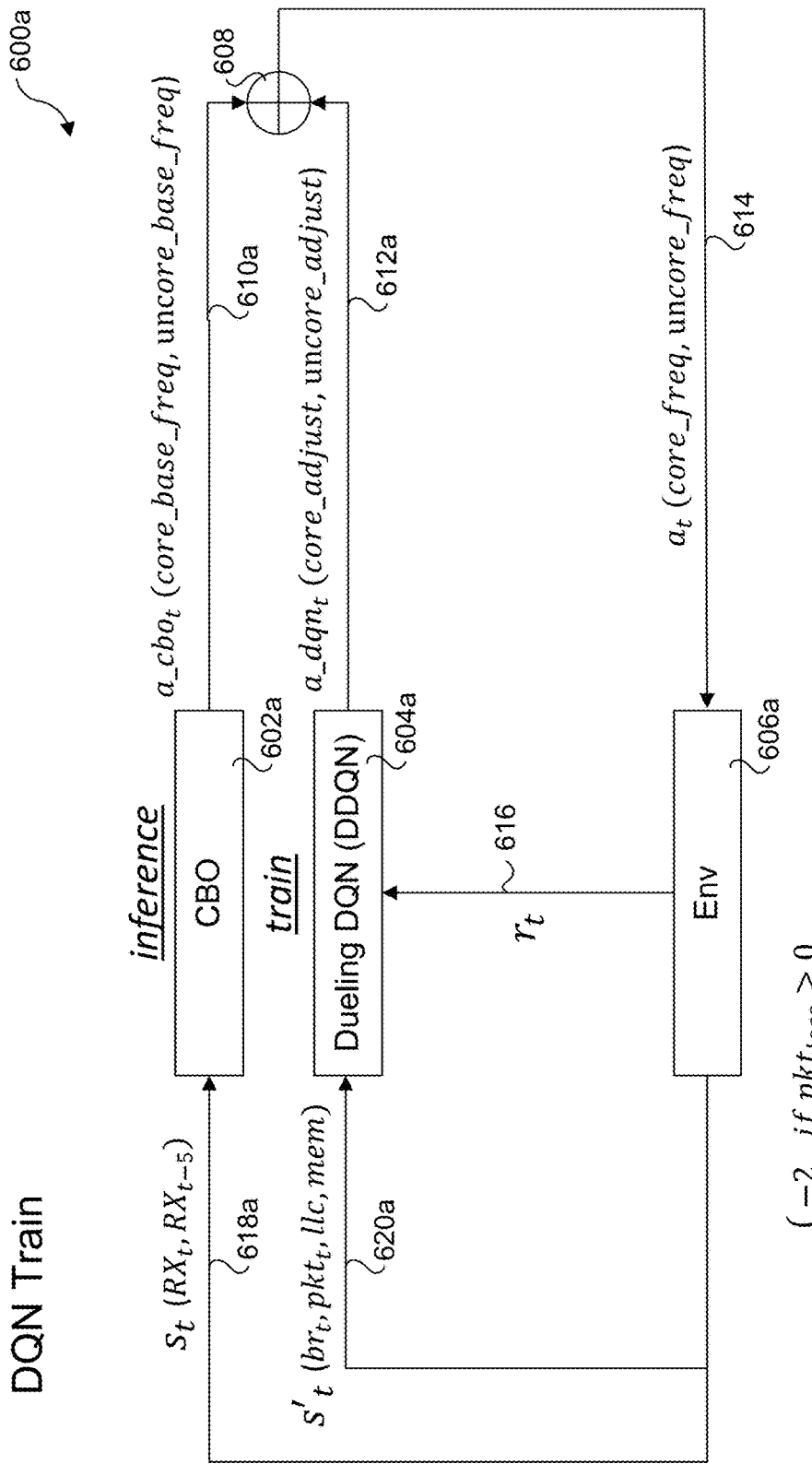
FIG. 6a is a diagram illustrating a DQN training model, according to one embodiment.

For the second layer, the trained CBO model is used in inference mode to derive the baseline core frequency as shown in a Deep Q Network (DQN) training diagram 600 in FIG. 6a. The second layer RL algorithm used in the non-limiting example here is Dueling Double DQN (DDQN). Alternatively, and of a DQN, Double DQN, Double DQN, or Dueling DDQN may be used in accordance with the teachings and principles disclosed herein.

Q learning is a form of model-free reinforcement learning that can be used to optimally solve MDPs. It provides agents with the capability of learning to act optimally in Markovian domains by experiencing the consequences of actions without requiring them to build maps of the domains. Double Q learning (Hasselt, Hado V. "Double Q-learning." *Advances in neural information processing systems.* 2010) improves upon Q learning by providing an alternate way to approximate the maximum expected action value using a double estimation method. DQN and Double DQN are implementations of Q learning and Double Q learning with a neural network having one or more hidden layers. For example, see Van Hasselt, Hado, Arthur Guez, and David Silver. "Deep reinforcement learning with double q-learning." *Thirtieth AAAI conference on artificial intelligence.* 2016.

Dueling DDQN further extends DDQN with dueling networks. Examples of Dueling DDQNs are described in Wang, Ziyu, et al. "Dueling network architectures for deep reinforcement learning." *International conference on machine learning.* 2016, with an implementation described at https://www.freecodecamp.org/news/improvements-in-deep-q-learning-dueling-double-dqn-prioritized-experience-replay-and-fixed-58b 130cc5682/. Further details for implementing Double DQN and Dueling DDQN algorithms are available online from multiple sources and are known in the art and outside the scope of this disclosure.

Since this second layer RL algorithm considers multiple service groups running on multiple cores that compete for the same uncore resources (e.g., last level cache, memory, etc.), in one embodiment the state $s'_t$ consists of LLC occupancy and local memory bandwidth for the core and identified derived telemetry information: branch misses to total branches ratio and packet poll empty count to packet poll non-empty count.

DQN training diagram 600a include a CBO inference block 602a, a Dueling DDQN block 604a, system environment (Env) block 606a, and a summing block 608. As discussed above, CBO inference block 602a corresponds to a trained CBO model and thus may be similar to CBO inference block 512 in FIG. 5b; that is CBO inference block 602a is obtained by training a CBO model under which the core frequency is adjusted while the uncore frequency is fixed. During DQN training both the core frequency and uncore frequency are adjusted using the hierarchy of RL algorithms comprising a CBO RL algorithm and a Dueling DDQN algorithm in the illustrated environment.

CBO inference block 602a outputs an action signal 610a comprising a core base frequency and an uncore base frequency, also depicted as a_cbo$_t$ (core_base_freq, uncore_base_freq). Dueling DDQN block 604a outputs an action signal 612a comprising adjustments to each of the core and uncore base frequencies, as depicted by a_dqn$_t$ (core_adjust, uncore_adjust). Action signals 610a and 612a are fed into summing block 608, which outputs an action signal 614a comprising a core frequency and uncore frequency to be implemented by Env 606a, as depicted by an action $a_t$ (core_freq, uncore_freq).

The action of DDQN is the adjustment of core frequency and uncore frequency. Instead of using two outputs, we combine two action into one output range from 0 to 11 and derive the core frequency adjustment and uncore frequency as follows:

$$\text{core\_frequency} = \begin{cases} \text{core}_{base_{freq}} - 100 \text{ MHz} & \text{if action \% 3 == 0} \\ \text{core}_{base_{freq}} & \text{if action \% 3 == 1} \\ \text{core}_{base_{freq}} + 100 \text{ MHz} & \text{if action \% 3 == 2} \end{cases}$$

$$\text{uncore\_frequency} = \begin{cases} 1200 \text{ MHz} & \text{if action}/4 == 0 \\ 1600 \text{ MHz} & \text{if action}/4 == 1 \\ 2000 \text{ MHz} & \text{if action}/4 == 2 \\ 2400 \text{ MHz} & \text{if action}/4 == 3 \end{cases}$$

Env 606a outputs a reward function ($r_t$) 616 that consists of three parts ($\tau_{pkt\_loss}$, $\tau_{core\_freq}$ and $\tau_{uncore\_freq}$), which respectively penalize packet loss, reward lower core adjustment, and reward lower uncore frequency. In one embodiment, $\tau_{pkt\_loss}$, $\tau_{core\_freq}$ and $\tau_{uncore\_freq}$ are calculated as follows:

$$r_{pkt\_loss} = \begin{cases} -2 & \text{if } pkt_{loss} > 0 \\ 1 & \text{if } pkt_{loss} == 0 \end{cases}$$

$$r_{core\_freq} = (1 - \text{core\_adjust}) * 0.1$$

$$r_{uncore\_freq} = (1 - \text{uncore}_{adjust}) * 0.2$$

$$r_t = r_{pkt\_loss} + r_{core\_freq} + r_{uncore\_freq}$$

Notice as uncore frequency saves more power than individual core, the weight is 0.2 for uncore and 0.1 for core frequency.

Rx state information 618a ($s_t(RX_t, RX_{t-5})$) comprising packet receive rates at times t and t−5 are also collected from Env 606a using associated telemetry data and fed back into CBO inference block 602a. As discussed above, state information 620a (state $s'_t$ ($br_t$, $pkt_t$, llc, mem)) consists of LLC occupancy and local memory bandwidth for the core and identified derived telemetry information: branch misses to total branches ratio and packet poll empty count to packet poll non-empty count, which are fed back into Dueling DDQN block 604a.

Figure 6B:
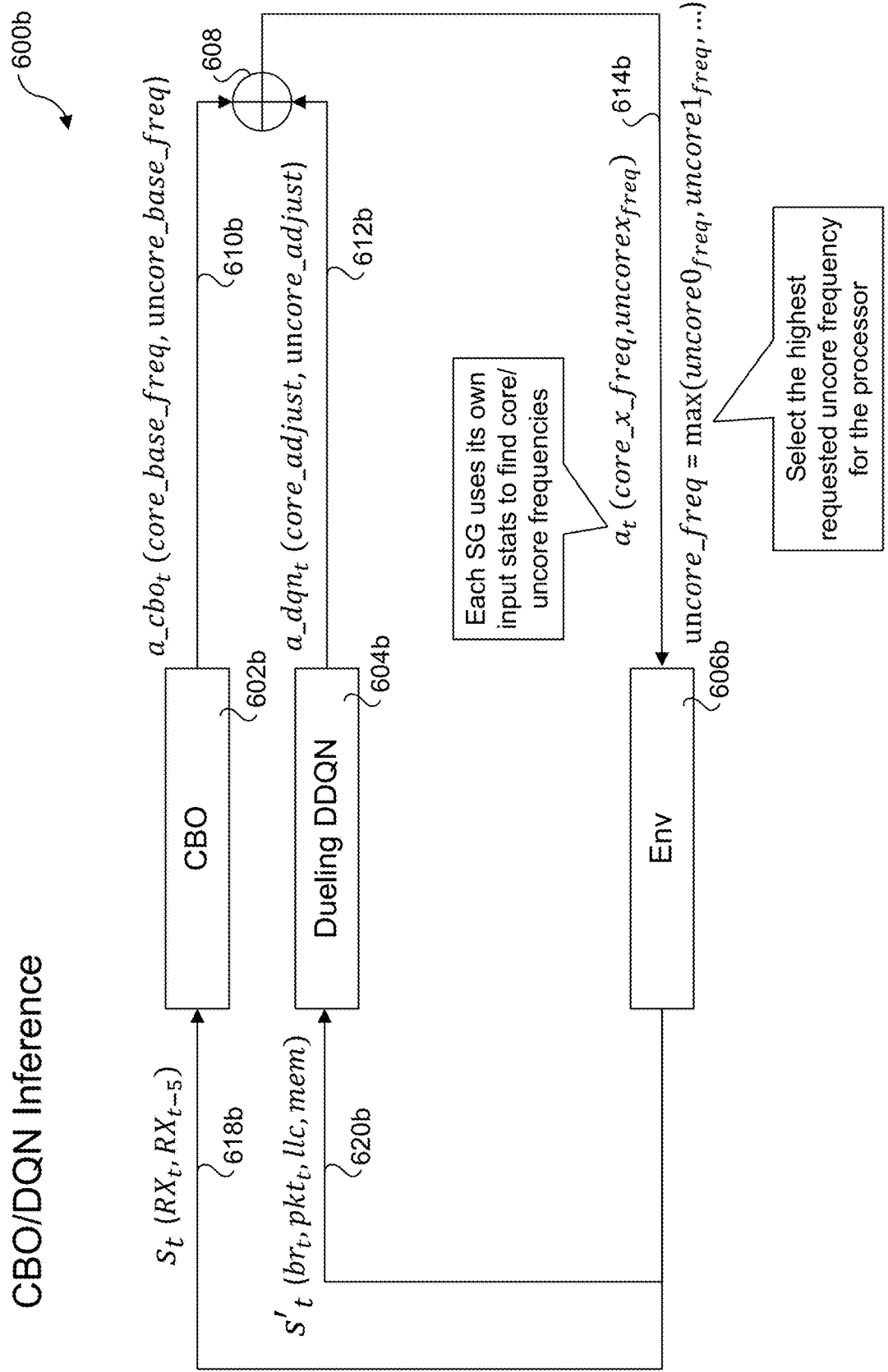
FIG. 6b is a diagram illustrating a hierarchical RL algorithm including a trained CBO model and a trained DDQN operating in an inference mode.

After training the Dueling DDQN model to adjust the core and uncore frequency, both the CBO model and Dueling DDQN models are used for inference flows, as shown in a diagram 600b of FIG. 6b. As illustrated, respective signals 610b, 612b, 618b, and 620b are the same as 610a, 612a, 618a, and 620a, except the subscript t represents subsequent time following training shown in FIG. 6a. Also, as illustrated for signal 614b, both the CBO and Dueling DDQN model runs for each service group (SG) using their different inputs to determine individual core and uncore frequencies for its respective service group. In one embodiment, for the uncore frequency the highest uncore frequency is picked among all the service groups.

Figure 7A:
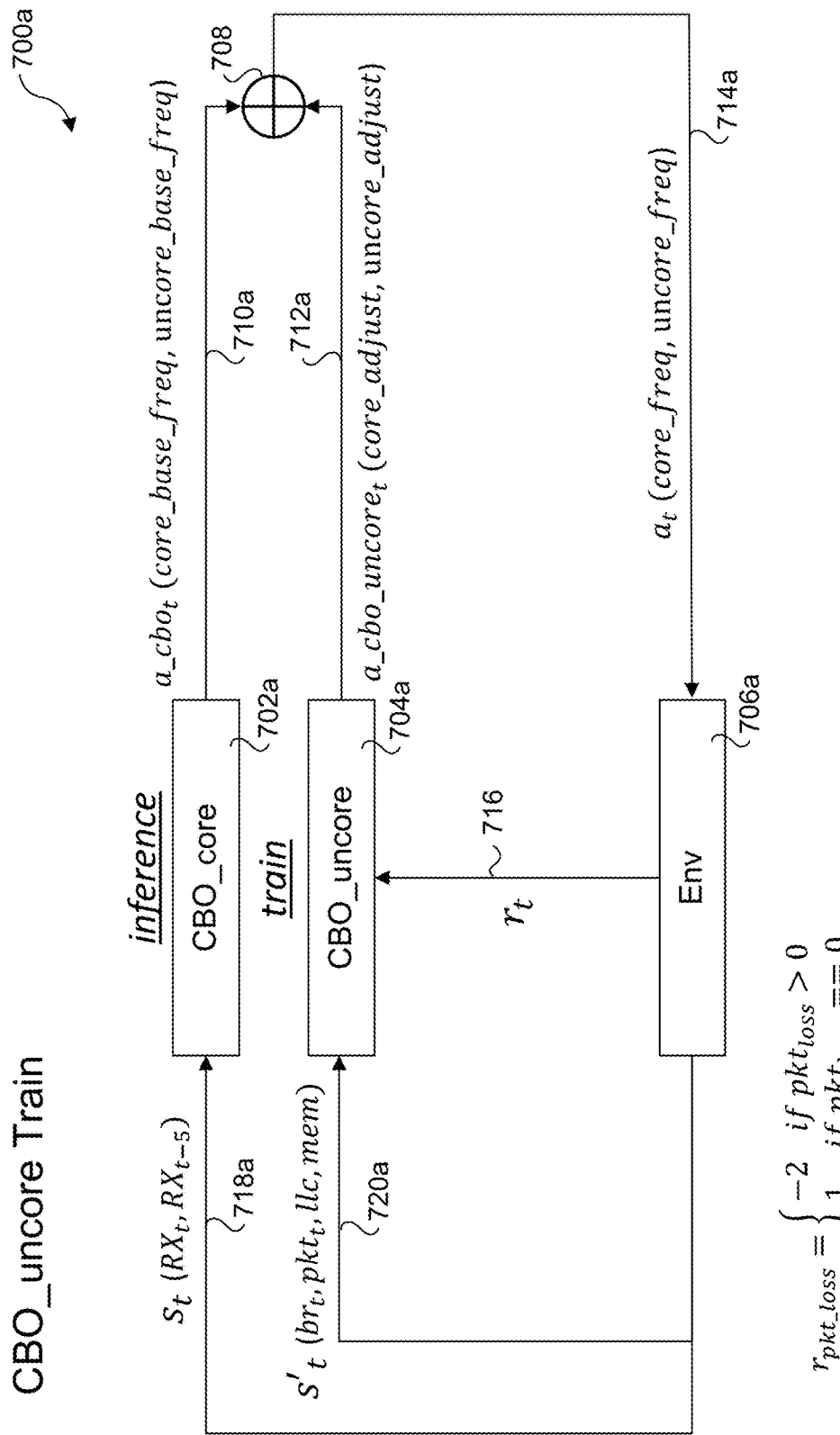
FIG. 7a is a diagram illustrating a CBO uncore training model, according to one embodiment.
Figure 7B:
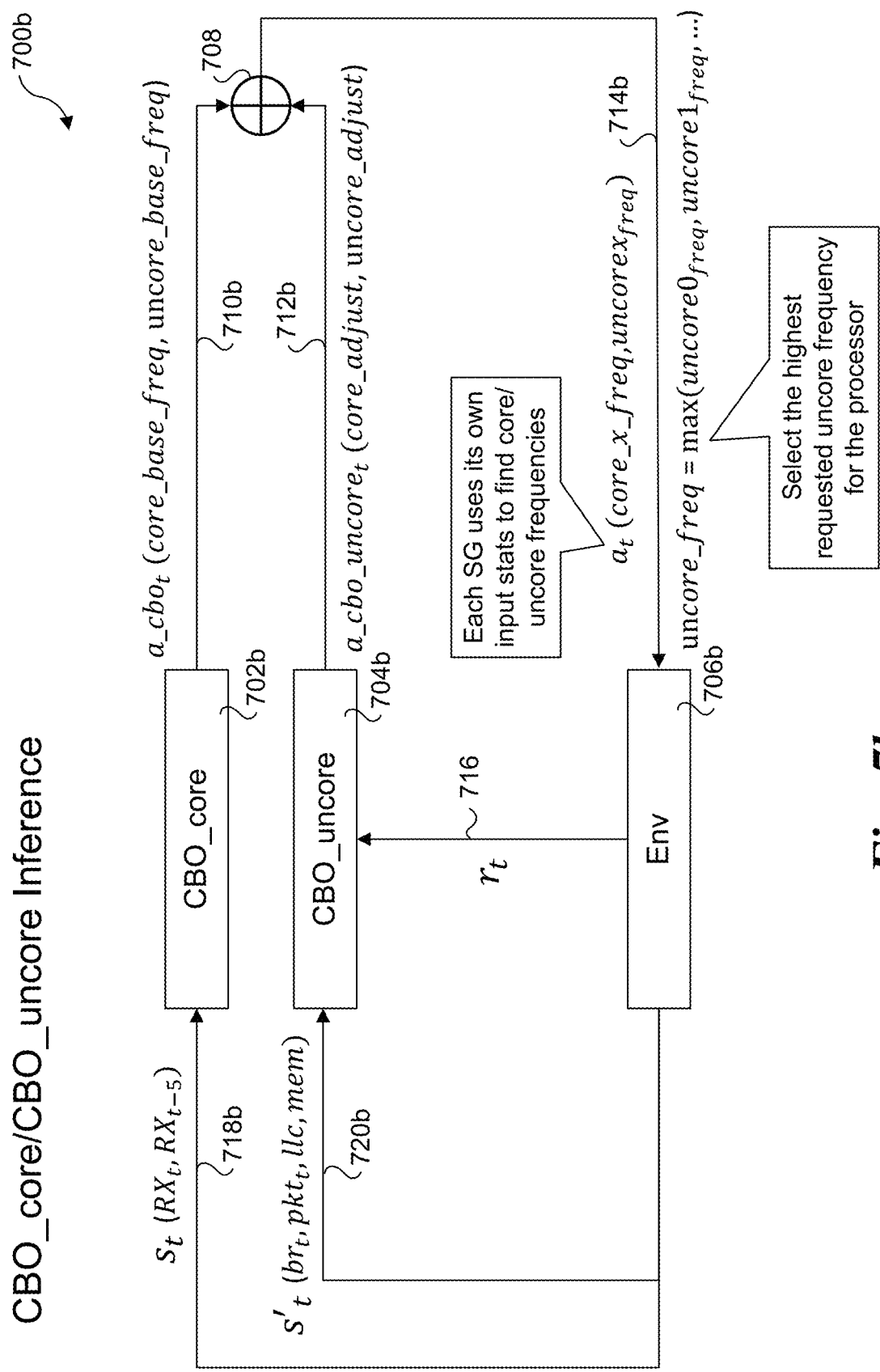
FIG. 7b is a diagram illustrating a hierarchical RL algorithm including a trained CBO core model and a trained CBO uncore model operating in an inference mode.

Under another approach, CBO models are used for both layers in the RL hierarchy. An example of this approach is illustrated in FIGS. 7a and 7b, where FIG. 7a shows a CBO_uncore training diagram 700a including a CBO_core inference block 702a, a CBO_uncore training block 704a, system environment (Env) block 706a, and a summing block 708. In a manner similar to the embodiments of FIGS. 5, 6a, and 6b, CBO inference block 702a corresponds to a trained CBO model that is obtained by training a CBO model under which the core frequency is adjusted while the uncore frequency is fixed. During CBO_uncore training both the core frequency and uncore frequency are adjusted using the hierarchy of CBO RL algorithms.

CBO_core inference block 702a outputs an action signal 710a comprising a core base frequency and an uncore base frequency, also depicted as a_cbo$_t$ (core_base_freq, uncore_base_freq). CBO_uncore training block 704a outputs an action signal 712a comprising adjustments to each of the core and uncore base frequencies, as depicted by a_cbo_uncoret (core_adjust, uncore_adjust). Action signals 710a and 712a are fed into summing block 708, which outputs an action signal 714a comprising a core frequency and uncore frequency to be implemented by Env 706a, as depicted by an action $a_t$ (core_freq, uncore_freq).

The action of CBO_uncore training is the adjustment of core frequency and uncore frequency. As before in the DDQN embodiment of FIG. 6a, we combine two action into one output range from 0 to 11 and derive the core frequency adjustment and uncore frequency as:

$$\text{core\_frequency} = \begin{cases} \text{core}_{base_{freq}} - 100 \text{ MHz} & \text{if action \% 3 == 0} \\ \text{core}_{base_{freq}} & \text{if action \% 3 == 1} \\ \text{core}_{base_{freq}} + 100 \text{ MHz} & \text{if action \% 3 == 2} \end{cases}$$

$$\text{uncore\_frequency} = \begin{cases} 1200 \text{ MHz} & \text{if action}/4 == 0 \\ 1600 \text{ MHz} & \text{if action}/4 == 1 \\ 2000 \text{ MHz} & \text{if action}/4 == 2 \\ 2400 \text{ MHz} & \text{if action}/4 == 3 \end{cases}$$

Env 706a outputs a reward function ($r_t$) 716 that consists of three parts ($r_{pkt\_loss}$, $\tau_{core\_freq}$ and $\tau_{uncore\_freq}$), which respectively penalize packet loss, reward lower core adjustment, and reward lower uncore frequency. In one embodiment, $\tau_{pkt\_loss}$, $\tau_{core\_freq}$ and $\tau_{uncore\_freq}$ are calculated as follows:

$$r_{pkt\_loss} = \begin{cases} -2 & \text{if } pkt_{loss} > 0 \\ 1 & \text{if } pkt_{loss} == 0 \end{cases}$$

$$r_{core\_freq} = (1 - \text{core\_adjust}) * 0.1$$

$$r_{uncore\_freq} = (1 - \text{uncore}_{adjust}) * 0.2$$

$$r_t = r_{pkt\_loss} + r_{core\_freq} + r_{uncore\_freq}$$

Rx state information 718a ($s_t(RX_t, RX_{t-5})$) comprising packet receive rates at times t and t−5 are also collected from Env 706a using associated telemetry data and fed back into CBO_core inference block 702a. Also, as before state information 720a (state $s'_t$ ($br_t$, $pkt_t$, 11c, mem)) consists of LLC occupancy and local memory bandwidth for the core and identified derived telemetry information: branch misses to total branches ratio and packet poll empty count to packet poll non-empty count, which are fed back into Cbo_uncore training block 704a.

After training the Cbo_uncore model to adjust the core and uncore frequency, both the CBO_core model and CBO_uncore model are used for inference flows, as shown in a diagram 700b of FIG. 7b. As shows, respective signals 710b, 712b, 718b, and 720b are the same as 710a, 712a, 718a, and 720a, except the subscript t represents subsequent times following training shown in FIG. 7a. Also, as illustrated for signal 714b, both the CBO_core and CBO_uncore model runs for each service group (SG) using their different inputs to determine individual core and uncore frequencies for its respective service group, and the uncore frequency the highest uncore frequency is picked among all the service groups.

FIG. 8 shows a process flow diagram 800 illustrating an implementation of a hierarchical RL algorithm combining the prior teachings shown in FIGS. 5, 6a, and 6b, according to one embodiment. The process involves three stages 802, 804, and 808 (also labeled Stage 1 Training, Stage 2 Mixed Inference and Training, and Stage 3 Combined Inference). Generally, Stage 1 and Stage 2 may be performed offline or online. Offline means the operations are performed using a different computer system or platform than the computer system or platform on which the trained hierarchical RL algorithm is deployed in stage 3. Online means the same system is used for stages 1, 2, and 3. The same computer system may be used for all three stages under some embodiments.

During the first training stage 802, the first level RL algorithm is selected, the inputs to monitor are selected, and the optimal core frequency under those inputs are learned. For example, the RL algorithm may be a CBO algorithm that is trained on a workload such as an NFV workload. The generally may be a workload may be a "live" workload or a simulated workload. The CBO training is depicted by a simplified version of CBO training model 500 shown in FIG. 5 and discussed above.

During the second mixed inference and training stage 804, the first level RL algorithm trained in Stage 1 is used to inference the core frequency. In parallel, the uncore frequency is varied based on different sets of monitored parameters (e.g., for different SGs, as discussed above). The optimal uncore frequency is learned and/or the core frequency is fine-tuned using the second level RL algorithm, such as DDQN in some embodiments. In example of Stage 2 is depicted as a simplified version of DQN training diagram 600a from FIG. 6a and discussed above.

During the third combined inference stage 806, the trained RL models/algorithms in the first and second levels of the RL hierarchy are operated in inference mode to optimize the core and uncore frequency given monitored workload and telemetry data, such as depicted by a simplified version of diagram 600b from FIG. 6b discussed above. These operations are implemented using an online workload.

Exemplary Platform/Computer Server and System Architectures

Figure 9:
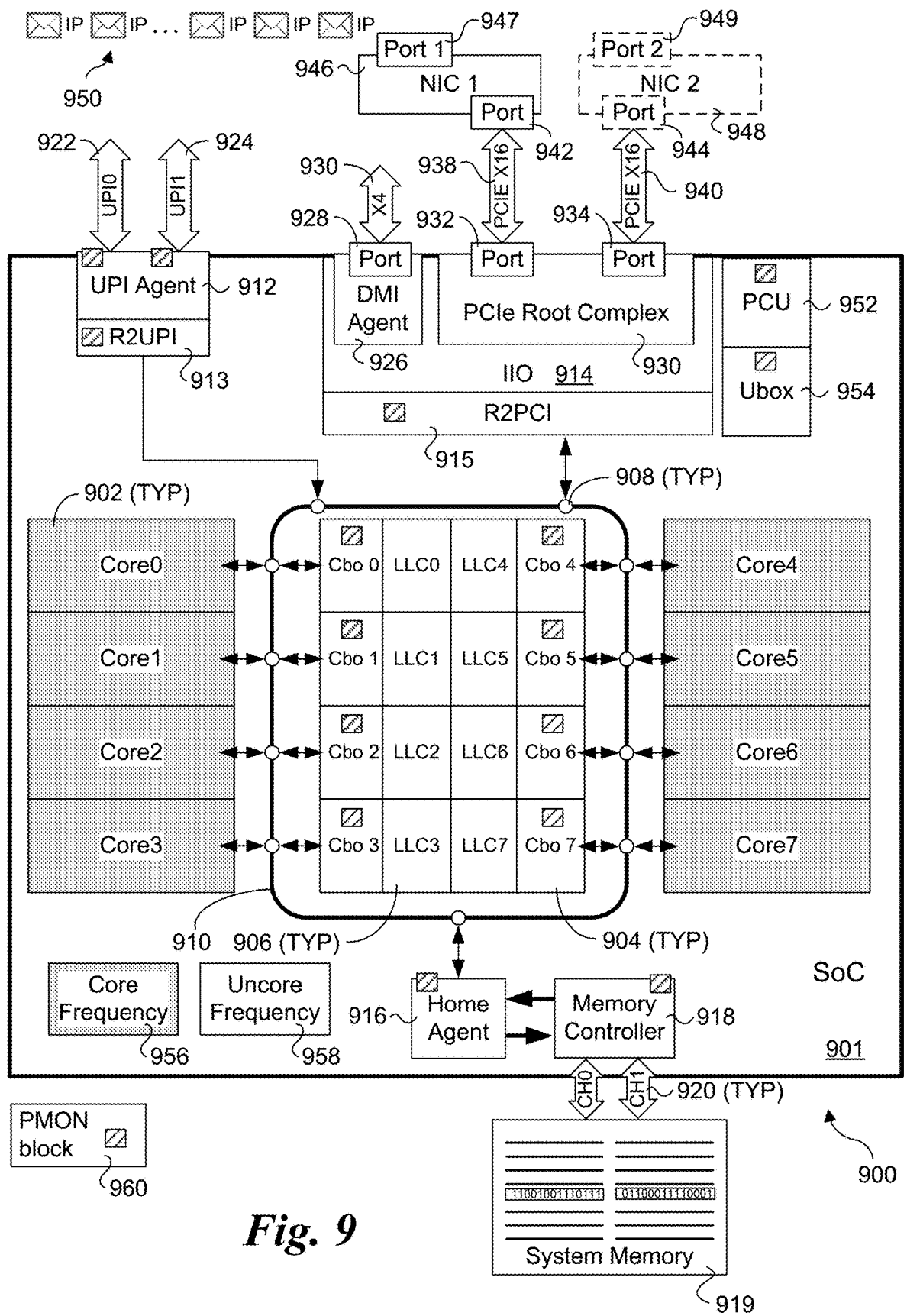
FIG. 9 is a schematic block diagram illustrating selected components of an exemplary processor and platform configuration via which aspects of the embodiments disclosed herein may be implemented.

FIG. 9 shows a platform architecture 900 depicting an 8-core System on a Chip (SoC) processor 901 including processor cores 902 (labeled Core0-Core7), which are coupled to respective caching boxes 904 (labeled Cbo 0-7, also referred to as CBOXes) and LLCs 906 (labeled LLC0-LLC7) via nodes 908 on a ring interconnect 910. In the illustrated embodiment, LLCs 906 are implemented as LLC "slices" that are associated with respective processor cores, but may be shared across cores through the CBOXes, which including coherent caching engines. In some embodiments, each processor core 902 includes a Level 1 (L1) and a Level 2 (L2) cache (not shown). The L1 cache includes an L1 instruction cache and an L1 data cache, while the L2 cache may be inclusive or non-inclusive. Also connected to ring interconnect 910 via corresponding nodes 908 are a UPI (Ultra Path Interconnect) agent 912, in Integrated Input/Output (IIO) block 914 and a Home Agent 916. UPI agent 912 is coupled to ring interconnect 910 via a Ring-to-UPI (R2UPI) interface 913, while IIO block 914 is coupled to ring interconnect 910 via a Ring-to-PCI (R2PCI) interface 915. Home agent 916 is coupled to a memory controller 918, which is used to access system memory 919 via one or more memory channels 920. UPI agent 912 is depicted as being coupled a pair of UPI links 922 and 924, enabling processor 901 to communicate with other platform components (not shown) via UPI.

In general, the components of processor 901 are interconnected via various types of interconnects, which are depicted as double-headed arrows for convenience. As discussed above, in one embodiment, processor 901 employs a ring interconnect 910. Optionally, the processor cores and related components and agents may be connected via an interconnect fabric (e.g., a 2D mesh interconnect). The interconnects may comprise point-to-point interconnects (e.g., UPI, PCIe, Intel on-chip System Fabric (IOSF), Open Core Protocol (OCP) etc.), as well as buses and other types of interconnect structures.

The IIO block in SoC processors is configured to perform IO interface operations similar to those performed by an IO chip or chipset in a conventional Northbridge/Southbridge platform architecture. However, rather than have these functions performed by a separate chip or chipset coupled to a processor via an external interconnect, they are now implemented by circuitry and logic embedded on the processor package (i.e., SoC) itself. This supports substantially higher bandwidths than available with conventional external interconnects, among other advantages.

Selected functional blocks are depicted for IIO block 914 in FIG. 9. These include a DMI agent and interface 926 including a port 928 coupled to an DMI x4 link 930. The IIO block includes a PCIe Root Complex 930 including PCIe root ports 932 and 934. PCIe root ports 932 and 934 provide PCIe interfaces to PCIe x16 links 938 and 940, which are respectively connected to PCIe ports 942 and 944 on a first NIC 946 (NIC 1) including a network port 947 and optional second NIC 948 (NIC 2) including a network port 949. NIC 946 is depicted as receiving a stream of packets 950 at a network port 947.

Processor 901 further includes a power control unit 952, a Ubox 954, a core frequency control block 956, an uncore frequency control block 958, and a plurality of performance monitor (PMON) blocks 960. Power control unit 952 is used to manage power aspects of processor 901, including putting the processor in different power states. Core frequency control block 956 is used to control the frequency of the core portion of the circuitry in processor 901, which is depicted as including processor cores 902 using gray shading. In some embodiments, the Cbo's and LLCs are operated using the core frequency. Under other architectures, the LLC(s) is considered part of the uncore. The remainder of the processor circuitry is considered the uncore, and its frequency is controlled by uncore frequency controller 958. As is known, this does not imply that all of the circuitry in the uncore portion of the processor circuitry operates at the same frequency, as processor typically include frequency dividers that are used to operator some (circuit) blocks at lower frequencies than other blocks. For illustrative purposes, core frequency control block 956 and uncore frequency control block 958 are depicted as separate block, while in practice that may be implemented in other blocks, such as in PCU 952.

PMON blocks 960 are distributed throughout processor 901 and are used to collect various telemetry data associated with the blocks in which the PMON blocks as shown. Generally, telemetry data collected from PMON blocks 960 may be exposed by software (e.g., via an Application Program Interface (API) or the like) running on the system to enable other software to obtain the telemetry data. In some embodiments discussed above, the various RL algorithms are implemented in software via execution of instructions on one or more of the processor cores and access the platform telemetry data via one or more telemetry data APIs.

Telemetry data may also be collected from cores 902 and from one or more IO devices, such as NICs 946 and 948. Software-based telemetry data may also be used in some embodiments.

Figure 10:
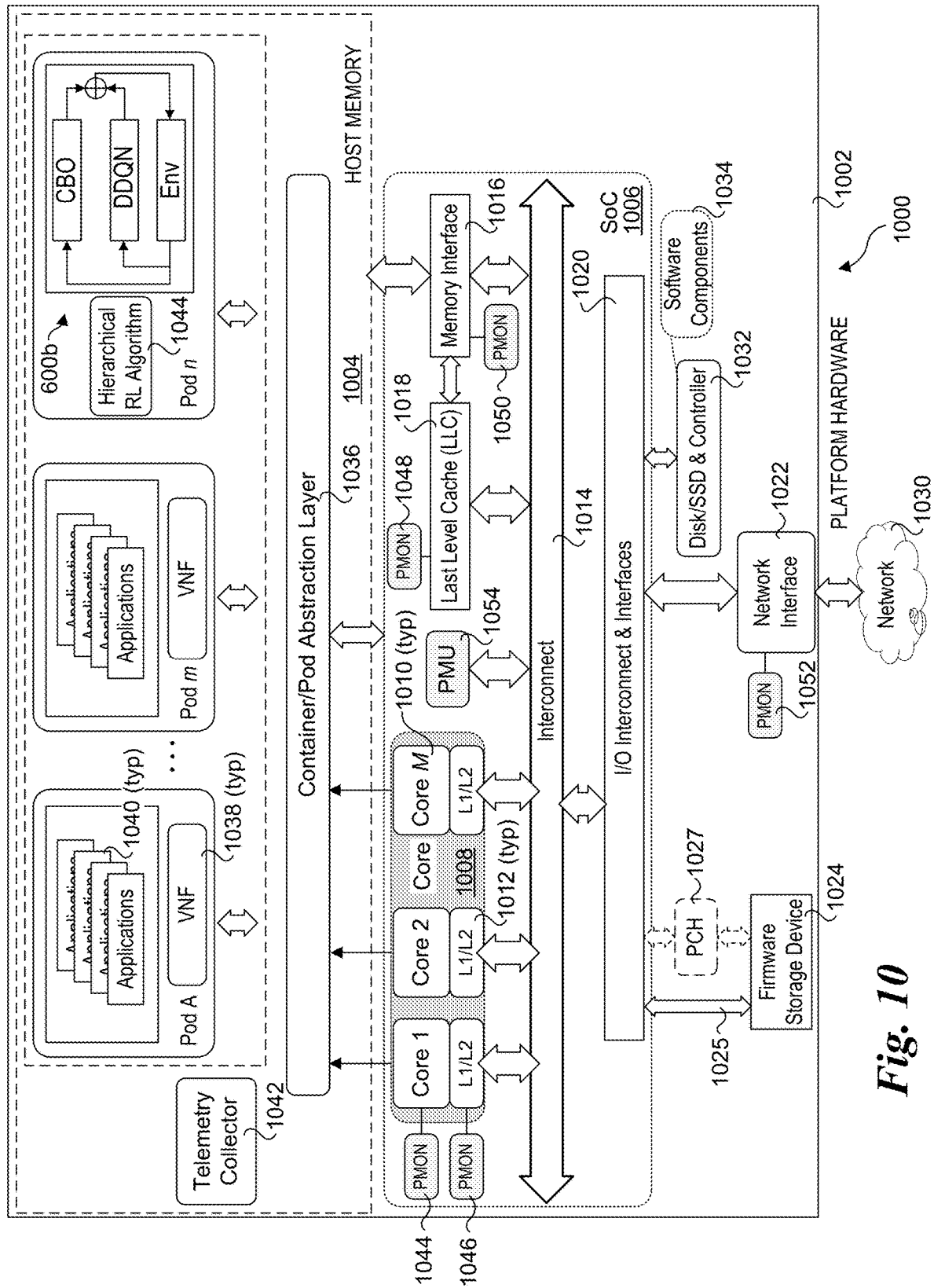
FIG. 10 is a schematic diagram of a server platform configured to implement aspects of the embodiments described and illustrated herein.

FIG. 10 shows an embodiment of a server platform architecture 1000 suitable for implementing aspects of the embodiments described herein. Architecture 1000 includes a hardware layer in the lower portion of the diagram including platform hardware 1002, and a software layer that includes software components running in host memory 1004. Platform hardware 1002 includes a processor 1006 having an SoC architecture including core circuitry 1008 with M processor cores 1010, each coupled to a Level 1 and Level 2 (L1/L2) cache 1012. Each of the processor cores and L1/L2 caches are connected to an interconnect 1014 to which a memory interface 1016 and a Last Level Cache (LLC) 1018 is coupled, forming a coherent memory domain. Interconnect is an abstracted representation of various types of interconnects including ring interconnects and mesh interconnects. Memory interface 1016 is used to access host memory 1004 in which various software components are loaded and run via execution of associated software instructions on processor cores 1010.

Processor 1006 further includes an Input/Output (IO) interconnect hierarchy, which includes one or more levels of interconnect circuitry and interfaces that are collectively depicted as I/O interconnect & interfaces 1020 for simplicity. Various components and peripheral devices are coupled to processor 1006 via respective interfaces (not all separately shown), including a network interface 1022 and a firmware storage device 1024. In one embodiment, firmware storage device 1024 is connected to IO interconnect via a link 1025, such as an Enhanced Serial Peripheral Interface Bus (eSPI). As an option, firmware storage device 1024 may be operatively coupled to processor 1006 via a platform controller hub (PCH) 1027.

Network interface 1022 is connected to a network 1030, such as a local area network (LAN), private network, or similar network within a data center. For example, various types of data center architectures may be supported including architecture employing server platforms interconnected by network switches such as Top-of-Rack (ToR) switches, as well as disaggregated architectures such as Intel® Corporation's Rack Scale Design architecture.

Platform hardware 1002 may also include a disk drive or solid-state disk (SSD) with controller 1032 in which software components 1034 are stored. Optionally, all or a portion of the software components used to implement the software aspects of embodiments herein may be loaded over a network 1030 accessed by network interface 1022.

The software components illustrated in FIG. 10 include a container/pod abstraction layer 1036 used to host n pods Pod A, Pod B, . . . Pod n, with Pods A, B, . . . m including an VNF 1038 implementing one or more applications 1040. In one embodiment, the Pods are Kubernetes Pods. Platform architectures employing containers, such as Docker®-type containers, may be implemented in a similar manner. Optionally, platform architectures employing VMs may be implemented using a Type-1 (bare metal) or Type-2 Hypervisor or VMM. The software components also include a telemetry collector 1042.

As further illustrated in FIG. 10, platform hardware 1002 includes various components for generating telemetry data, as depicted by PMONs (performance monitors) 1044, 1046, 1048, 1050, 1052 and a PMU 1054. Examples of telemetry data include but are not limited to processor core telemetry data, cache-related telemetry data, memory-related telemetry data, network telemetry data, and power data. The cache-related telemetry data may include but is not limited to Cache Monitoring Technology (CMT), Cache Allocation Technology (CAT), and Code and Data Prioritization (CDP) telemetry data. CMT monitors LLC utilization by individual threads, applications, VMs, VNFs, etc. CMT improves workload characterization, enables advanced resource-aware scheduling decisions, aids "noisy neighbor" detection and improves performance debugging. CAT enables software-guided redistribution of cache capacity, enabling VMs, containers or applications to benefit from improved cache capacity and reduced cache contention. CDP is an extension of CAT that enables separate control over code and data placement in the LLC. Certain specialized types of workloads may benefit with increased runtime determinism, enabling greater predictability in application performance.

In one embodiment, PMON 1050 implements Memory Bandwidth Monitoring (MBM). MBM enables multiple VMs, VNFs, or applications to be tracked independently, which provides memory bandwidth monitoring for each running thread simultaneously. Benefits include detection of noisy neighbors, characterization and debugging of performance for bandwidth-sensitive applications, and more effective non-uniform memory access (NUMA)-aware scheduling.

In the illustrated embodiment, Pod n is used to host a hierarchical RL algorithm 1044 that has been trained either online or offline to optimize power by adjusting the frequency of the core and uncore circuitry on processor 1006 in the manner described above. For illustrative purposes, a deployment of hierarchical RL algorithm 1044 is depicted as a simplified version of diagram 600*b* in FIG. 6*b*. In some embodiments, VNF 1038 are deployed to support one or more NFV workloads.

In the foregoing examples, reinforcement learning algorithms and models are used. However, this is meant to be merely exemplary and non-limiting, as other types of machine learning (ML) algorithms may be used in addition to RL algorithms described above. For example, such ML and/or RL algorithms may include but are not limited to temporal difference algorithms, Monte-Carlo Tree Search algorithms, Asynchronous Actor-Critic Agents, Autoencoders, deep RL algorithms, Markov Decision algorithms, ML algorithms employing Hidden Markov models, Markov chain Monte Carlo sampling, Baum-Welch algorithms, and expectation-maximization algorithms.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'm', 'n', 'M', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in one or more systems, each including a processor having a core comprising a first portion of circuitry including a plurality of cores and a second portion of circuitry external to the core, the method comprising:
    while executing software on a first processor in a first system to perform a first workload,
        training a first machine learning (ML) model by adjusting a frequency of the core of the first processor to obtain a first trained ML model; and
        implementing the trained ML model in an inference mode while training a second ML model by adjusting a frequency of the core and a frequency of the second portion of circuitry of the first processor to obtain a second trained ML model.

2. The method of claim 1, further comprising:
    on the first system or a second system having a second processor,
        implementing the first ML model and second ML model in inference modes to adjust the frequency of the core and the frequency of the second portion of circuitry while executing software on the plurality of cores of the first or second processor to perform a continuation of the first workload or perform a second workload.

3. The method of claim 2, wherein the first workload or second workload is a Network Function Virtualization (NFV) workload, further comprising adjusting the frequency of the core and the frequency of the second portion of circuitry to optimize power while maintaining a service level agreement associated with the NFV workload.

4. The method of claim 1, wherein the first and second ML models respectively comprise first and second reinforcement learning (RL) models that are trained by:
training the first RL model by adjusting a frequency of the core of the first processor to obtain a first trained RL model; and
implementing the trained RL model in an inference mode and at a first level in an RL model hierarchy while training the second RL model at a second level in the RL model hierarchy by adjusting a frequency of the core and a frequency of the second portion of circuitry of the first processor to obtain a second trained RL model.

5. The method of claim 4, wherein the first RL model employs a contextual Bayesian optimization (CBO) algorithm.

6. The method of claim 5, wherein training the CBO algorithm comprises:
sampling network operating state telemetry data;
adjusting the core frequency while holding the frequency of the second portion of circuitry constant;
receiving a reward value as a function of the adjustment of the core frequency and the sampled network operating state telemetry data; and
updating a CBO model based on adjustments to the core frequency, sampled network operating state telemetry data, and reward values.

7. The method of claim 1, wherein the second ML model employs one of a Deep Q Network (DQN) algorithm, a Dueling DQN algorithm, a Dueling Double DQN algorithm, and a contextual Bayesian optimization algorithm.

8. The method of claim 4, further comprising:
while implementing the first RL model and second RL model in the first and second levels of the RL model hierarchy in inference mode,
executing software on the plurality of processor cores corresponding to a plurality of service groups (SGs), for each SG,
employing telemetry data relating to the service group to determine frequencies for the core and the second portion of circuitry.

9. The method of claim 8, further comprising:
selecting a highest frequency for the second portion of circuitry among the frequencies for the second portion of circuitry that are determined for the plurality of SGs.

10. A system, comprising:
a processor having,
a core comprising a first portion of circuitry including a plurality of cores; and
a second portion of circuitry external to the core including one or more memory controllers and one or more Input-Output (TO) interfaces;
memory, coupled to the one or more memory controllers;
a network interface, coupled to an IO interface and having one or more ports at which packets are received; and
first and second software configured to be executed on the plurality of cores,
wherein execution of the first software enables the system to perform a workload, and wherein execution of the second software enables the system to adjust a frequency of the core and a frequency of the uncore while performing the workload using a hierarchical Machine Learning (ML) algorithm including a first ML model implemented in an inference mode in a first level of the hierarchy and second ML model implemented in an inference mode in a second level of the hierarchy.

11. The system of claim 10, wherein the workload is a Network Function Virtualization (NFV) workload, and the hierarchical ML algorithm adjusts the frequency of the core and the frequency of the second portion of circuitry to optimize power while maintaining a service level agreement associated with the NFV workload.

12. The system of claim 10, wherein the first ML model employs a contextual Bayesian optimization (CBO) algorithm.

13. The system of claim 10, wherein the second ML model employs one of a Deep Q Network (DQN) algorithm, a Dueling DQN algorithm, and a Dueling Double DQN algorithm.

14. The system of claim 10, wherein execution of the first software performs workloads associated with a plurality of service groups, and wherein execution of the first and second software enables the system to:
for each service group,
collect telemetry data relating to the service group; and
employ the telemetry data that is collected to determine frequencies for the core and the second portion of circuitry for the service group.

15. The system of claim 14, wherein execution of the first and second software further enables the system to select a highest frequency for the second portion of circuitry among the frequencies for the second portion of circuitry that are determined for the plurality of service groups.

16. One or more non-transitory machine-readable mediums having first software instructions stored thereon configured to be executed on a processor having a core comprising a first portion of circuitry associated with plurality of cores and a second portion of circuitry external to the core, the processor implemented in a first system, the first software instructions associated with a hierarchical Reinforcement Learning (RL) algorithm including a first RL model implemented in a first level of a hierarchy and a second RL model implemented in a second level of the hierarchy, wherein execution of the first software instructions enables the first system to:
while executing second software instructions on one or more of the plurality of cores to perform a workload, adjust a frequency of the core and a frequency of the uncore using the hierarchical RL algorithm.

17. The one or more non-transitory machine-readable mediums of claim 16, wherein the workload is a Network Function Virtualization (NFV) workload, and wherein the hierarchical Reinforcement Learning (RL) algorithm adjusts the frequency of the core and the frequency of the second portion of circuitry to optimize power while maintaining a service level agreement associated with the NFV workload.

18. The one or more non-transitory machine-readable mediums of claim 16, wherein the first RL model employs a contextual Bayesian optimization (CBO) algorithm.

19. The one or more non-transitory machine-readable mediums of claim 16, wherein the second RL model employs one of a Deep Q Network (DQN) algorithm, a Dueling DQN algorithm, a Dueling Double DQN algorithm, and a contextual Bayesian optimization (CBO) algorithm.

20. The one or more non-transitory machine-readable mediums of claim 16, wherein execution of the first software performs workloads associated with a plurality of service groups, and wherein execution of the first and second software enables the first system to:

for each service group,
collect telemetry data relating to the service group; and
employ the telemetry data that is collected to determine frequencies for the core and the second portion of circuitry frequencies for the service group.

21. The one or more non-transitory machine-readable mediums of claim 20, wherein execution of the first and second software further enables the first system to select a highest frequency for the second portion of circuitry among the frequencies for the second portion of circuitry that are determined for the plurality of service groups.

22. The one or more non-transitory machine-readable mediums of claim 16, wherein execution of the first and second software on the processor of the first system or a processor of a second system having a similar configuration as the processor of the first system enables the first system or second system to:
while executing the second software instructions on one or more of the plurality of cores of the first or second processor to perform a workload,
train the first RL model by adjusting a frequency of the core of the first processor to obtain a first trained RL model; and
implement the trained RL model in an inference mode and at the first level in an RL model hierarchy while training the second RL model at the second level in the RL model hierarchy by adjusting a frequency of the core and a frequency of the second portion of circuitry of the first processor to obtain a second trained RL model.

23. The one or more non-transitory machine-readable mediums of claim 22, wherein the first RL model employs a contextual Bayesian optimization (CBO) algorithm and is trained by:
sampling network operating state telemetry data;
adjusting the core frequency while holding the frequency of the second portion of circuitry constant;
receiving a reward value as a function of the adjustment of the core frequency and the sampled network operating state telemetry data; and
updating a CBO model based on adjustments to the core frequency, sampled network operating state telemetry data, and reward values.

* * * * *

UNITED STATES PATENT AND TRADEMARK OFFICE
CERTIFICATE OF CORRECTION

PATENT NO.          : 12,001,932 B2
APPLICATION NO.     : 16/939237
DATED               : June 4, 2024
INVENTOR(S)         : Zhu Zhou et al.

It is certified that error appears in the above-identified patent and that said Letters Patent is hereby corrected as shown below:

In the Claims

Claim 10: should read: A system, comprising:
a processor having,
a core comprising a first portion of circuitry including a plurality of cores; and
a second portion of circuitry external to the core including one or more memory controllers and one or more Input-Output (IO) interfaces;
memory, coupled to the one or more memory controllers;
a network interface, coupled to an IO interface and having one or more ports at which packets are received; and first and second software configured to be executed on the plurality of cores,
wherein execution of the first software enables the system to perform a workload, and wherein execution of the second software enables the system to adjust a frequency of the core and a frequency of the uncore while performing the workload using a hierarchical Machine Learning (ML) algorithm including a first ML model implemented in an inference mode in a first level of the hierarchy and second ML model implemented in an inference mode in a second level of the hierarchy.

Signed and Sealed this
Third Day of September, 2024

Katherine Kelly Vidal
*Director of the United States Patent and Trademark Office*